(12) United States Patent
Cheng et al.

(10) Patent No.: US 11,729,260 B2
(45) Date of Patent: Aug. 15, 2023

(54) INTERNET-OF-THINGS RESOURCE ACCESS SYSTEM AND METHOD

(71) Applicant: Beijing University of Posts and Telecommunications, Beijing (CN)

(72) Inventors: Bo Cheng, Beijing (CN); Yang Zhang, Beijing (CN); Shuai Zhao, Beijing (CN); Junliang Chen, Beijing (CN)

(73) Assignee: Beijing University of Posts and Telecommunications, Beijing (CN)

( * ) Notice: Subject to any disclaimer, the term of this patent is extended or adjusted under 35 U.S.C. 154(b) by 0 days.

(21) Appl. No.: 17/958,357

(22) Filed: Oct. 1, 2022

(65) Prior Publication Data
US 2023/0033284 A1 Feb. 2, 2023

Related U.S. Application Data

(63) Continuation of application No. PCT/CN2020/114953, filed on Sep. 14, 2020.

(30) Foreign Application Priority Data

Apr. 7, 2020 (CN) .......................... 202010271735.3

(51) Int. Cl.
*H04L 69/08* (2022.01)
*H04L 67/1008* (2022.01)
*H04L 67/12* (2022.01)

(52) U.S. Cl.
CPC .......... *H04L 67/1008* (2013.01); *H04L 67/12* (2013.01); *H04L 69/08* (2013.01)

(58) Field of Classification Search
CPC ...... H04L 67/1008; H04L 67/12; H04L 69/08
See application file for complete search history.

(56) References Cited

U.S. PATENT DOCUMENTS

| 9,264,313 B1* | 2/2016 | Manuguri ............... H04L 41/12 |
| 2014/0359131 A1* | 12/2014 | Seed .................... H04L 67/1031 |
| | | 709/226 |

(Continued)

FOREIGN PATENT DOCUMENTS

| CN | 108011814 A | 5/2018 |
| CN | 108370377 A | 8/2018 |

(Continued)

OTHER PUBLICATIONS

Title of the Item: China Master's Theses Full-text Database Publication Date: Apr. 15, 2016 Name of the Author: Xiaojie Yuan Article Title: The Designand Implementation of Iotopen Platform Based On Cloudcomputing.

(Continued)

*Primary Examiner* — Kim T Nguyen
(74) *Attorney, Agent, or Firm* — Nitin Kaushik

(57) ABSTRACT

Embodiments of the present disclosure provide an Internet-of-Things resource access system and method. The system comprises a protocol management subsystem, a data conversion subsystem, and a load balancing subsystem. The protocol management subsystem is configured to obtain protocol frames from shared storage queues of protocol data packets, use a protocol stack to parse the protocol frames into original data payloads and provide the original data payloads to a data conversion subsystem; the data conversion subsystem is configured to perform protocol management, resource binding and data conversion, load Internet-of-Things resources and convert the original data payloads into observation data through multi-threaded concurrency; and the load balancing subsystem is configured to access the Internet-of-Things resources to the system through virtual IP, connect the Internet-of-Things resource to background service nodes through load balancing servers and send the (Continued)

protocol frames to the shared storage queues of the protocol data packets.

6 Claims, 9 Drawing Sheets

(56) References Cited

U.S. PATENT DOCUMENTS

| | | | |
|---|---|---|---|
| 2019/0373435 A1 | 12/2019 | Panje | |
| 2022/0036302 A1* | 2/2022 | Cella | ............ G06Q 10/0639 |

FOREIGN PATENT DOCUMENTS

| | | |
|---|---|---|
| CN | 109314887 A | 2/2019 |
| CN | 109588059 A | 4/2019 |
| CN | 110012121 A | 7/2019 |
| CN | 110213242 A | 9/2019 |

OTHER PUBLICATIONS

Title of the Item: China Master's Theses Full-text Database Publication Date: Apr. 15, 2018 Name of the Author: Minglang Yang Article Title: Design and Implementation of Intelligent Access Module of IOT Resource Access and Intelligent Processing Platform.

* cited by examiner

INTERNET-OF-THINGS RESOURCE ACCESS SYSTEM AND METHOD

CROSS-REFERENCE TO RELATED APPLICATIONS

The application claims priority to Chinese patent application No. 202010271735.3, filed on Apr. 7, 2020, the entire contents of which are incorporated herein by reference.

TECHNICAL FIELD

The present disclosure relates to the technical field of Internet-of-Things, and in particular to an Internet-of-Things resource access system and method.

BACKGROUND

In the application of the Internet-of-Things, the Internet-of-Things service resource access system plays an important role, and is used for accessing Internet-of-Things resources to the network and accessing and controlling the Internet-of-Things resources. As the cornerstone of the Internet-of-Things application, the system is indispensable in the Internet-of-Things. With the continuous development of Internet-of-Things technology, it is need to access large-scale heterogeneous sensors to more Internet-of-Things applications, and meanwhile the Internet-of-Things access system is required to maintain stable operation. This puts forward higher requirements for the Internet-of-Things resource access system, which is mainly reflected in the following points: (1) the carrying capacity of the system in high concurrency scenarios is improved, and the system can support the large-scale Internet-of-Things resource access; (2) the system is flexibly expanded to realize the dynamic configuration and dynamic loading of heterogeneous Internet-of-Things resources; and (3) an effective high availability and state transfer mechanism improves the reliability of the Internet-of-Things resource access system.

The current mainstream Internet-of-Things resource access solutions comprise Alibaba Cloud Internet-of-Things, Baidu Tiangong Internet-of-Things, Cisco Jasper, etc. Alibaba Cloud Internet-of-Things and Baidu Tiangong Internet-of-Things process Internet-of-Things resource access mainly based on a cloud platform with weak support for edges and ends. Cisco Jasper has strengthened support for the edges to a certain extent, and provides the ability to convert Internet-of-Things sensor data and perform control functions within a distributed network infrastructure with weaker support for clouds and ends. With the promotion of 5G technology in the new era, the further integration of Internet-of-Things resource access solutions in the cloud, edge and end has become the general trend.

SUMMARY

Embodiments of the present disclosure provide an Internet-of-Things resource access system and method, which are used to solve the defects of uneven resource allocation in the Internet-of-Things access in the existing technology, the inability to achieve the same degree of support for each node, the inflexible deployment, and the like.

In First aspect, an embodiment of the present disclosure provides an Internet-of-Things resource access system. The Internet-of-Things resource access system comprises:

a protocol management subsystem, a data conversion subsystem, and a load balancing subsystem, wherein a protocol management subsystem is configured to obtain protocol frames from shared storage queues of protocol data packets, use a protocol stack to parse the protocol frames into original data payloads and provide the original data payloads to a data conversion subsystem;

the data conversion subsystem is configured to perform protocol management, resource binding and data conversion, load Internet-of-Things resources and convert the original data payloads into observation data through multi-threaded concurrency; and the load balancing subsystem is configured to access the Internet-of-Things resources to the system through virtual IP, connect the Internet-of-Things resource to background service nodes through load balancing servers and send the protocol frames to the shared storage queues of the protocol data packets.

Preferably, the protocol management subsystem comprises a protocol and protocol stack dynamic loading module, a protocol stack generation module and a protocol parsing module, wherein the protocol and protocol stack dynamic loading module is configured to dynamically load protocols and the protocol stack in preset configuration modes;

the protocol stack generation module is configured to generate the protocol stack in preset configuration modes; and the protocol parsing module is configured to use the protocol stack to parse the protocol frames layer by layer.

Preferably, the preset configuration modes comprise manual configuration and automatic configuration.

Preferably, the data conversion subsystem comprises a resource management module, a resource binding module, and a data conversion module, wherein the resource management module is configured to instantiate the Internet-of-Things resources;

the resource binding module is configured to bind the Internet-of-Things resources with semantic information; and the data conversion module is configured to interpret and use data of the original data payloads.

Preferably, the load balancing subsystem comprises the connection management module, the thread monitoring and switching triggering function module, the load balancing function module and the service node state migration mechanism module, wherein the connection management module is configured to establish and manage a data path between service nodes and the Internet-of-Things resources;

the thread monitoring and switching triggering function module is configured to monitor the running state of the front thread of the system based on a memory forensics technology, construct a thread health state event when the state of the front thread is abnormal, and trigger the switching of the service nodes;

the load balancing function module is configured to forward the connection request of the Internet-of-Things resources to an available service node based on an improved load balancing algorithm; and the service node state migration mechanism module is configured to read a checkpoint of a communication process when the data path is abnormal, and complete the state migration of the service node.

Preferably, the improved load balancing algorithm is obtained by two-channel decision provided by the load balancing server, connection request merging and based on the performance of several servers.

In second aspect, an embodiment of the present disclosure provides an Internet-of-Things resource access method. The method comprises:

constructing a protocol management subsystem which is configured to obtain protocol frames from shared storage queues of protocol data packets, use a protocol stack to parse the protocol frames into original data payloads and provide the original data payloads to the data conversion subsystem;

constructing a data conversion subsystem which is configured to perform protocol management, resource binding and data conversion, load Internet-of-Things resources and convert the original data payloads into observation data through multi-threaded concurrency; and constructing the load balancing subsystem which is configured to access the Internet-of-Things resources to the system through virtual IP, connect the Internet-of-Things resource to background service nodes through load balancing servers and send the protocol frames to the shared storage queues of the protocol data packets.

Preferably, the constructing the protocol management subsystem further comprises establishing a protocol dynamic loading function process, and the establishing a protocol dynamic loading function process specifically comprises steps that:

a file listener executes the task of regularly scanning the storage path of a specified protocol program package; and if the file listener determines that there is a new protocol package in the storage location of the protocol program package, the protocols are loaded based on a reflection mechanism.

The constructing the data conversion subsystem further comprises establishing a data interpretation process flow, and the establishing a data interpretation process flow specifically comprises steps:

performing protocol analysis on the original data payloads in the Internet-of-Things resources;

acquiring the address of a monitoring unit connected to the Internet-of-Things resource of an original data payload header;

If it is determined that the original data payload has remaining content, obtaining the first address of the Internet-of-Things resource;

according to the address of the monitoring unit, the address of a sensor and the name of a substation, determining a single Internet-of-Things resource entity, and querying the data type and data conversion information of the Internet-of-Things resource entity;

according to the original data length, intercepting the original data of the Internet-of-Things resource monitoring from the original data payload;

converting the original data into observation data by using the data conversion information according to the data type; and completing the data interpretation corresponding to the first address, returning to determine that the original data payload has remaining content, and obtaining the remaining addresses of the Internet-of-Things resources until all data interpretation of the original data payload is completed.

Preferably, the constructing the load balancing subsystem further comprises establishing an improved load balancing algorithm flow based on the performance of several servers, and the establishing an improved load balancing algorithm flow based on the performance of several servers specifically comprises steps:

adding a session stick table to the load balancing server;

initiating a connection request by an operation control terminal to the service cluster;

the load balancing server obtains the connection request, and query whether the session stick table session contains the connection record of the operation control terminal;

if it is determined that the session stick table contains the connection record, obtaining the IP of the service node connected by the operation control terminal last time;

the load balancing server detects the service node connected by the operation control terminal last time, and determines whether the service node is alive or not;

forwarding the connection request to the service node connected by the operation control terminal last time;

removing the connection relationship between the operation control terminal and the service node from the session stick table;

calculating the request processing capability of all optional service nodes in the service cluster, and the load balancer forwards the connection request to the server node with the strongest current request processing capability;

storing the connection relationship between the operation control terminal and the server node with the strongest current request processing capability into the session stick table; and the operation control terminal is successfully connected to the service node.

The Internet-of-Things resource access system and method provided by the embodiments of the present disclosure not only realize the simultaneous application of ends, edges, and clouds in the aspects of Internet-of-Things resource access, resource management, protocol analysis, etc., but also support automatic adaptation, ensure a sufficient degree of flexibility, and support multiple system deployment modes.

BRIEF DESCRIPTION OF DRAWINGS

In order to describe the technical solutions in the embodiments of the present disclosure or the prior art more clearly, the drawings required to be used in the description of the embodiments or the prior art will be briefly introduced below. It is apparent that the drawings described below are only some embodiments of the present disclosure. Those of ordinary skill in the art may further obtain other drawings according to these drawings without creative work.

DETAILED DESCRIPTION OF THE EMBODIMENTS

In order to make objects, technical solutions and advantages of embodiments of the present disclosure clearer, the technical solutions in the embodiments of the present disclosure are clearly and completely described below in conjunction with the accompanying drawings in the embodiments of the present disclosure, and it is apparent that the described embodiments are parts of embodiments rather than all embodiments of the present disclosure. Based on the embodiments of the present disclosure, all other embodiments obtained by a person of ordinary skill in the art without involving any inventive effort all fall within the scope of the present disclosure.

Figure 1:
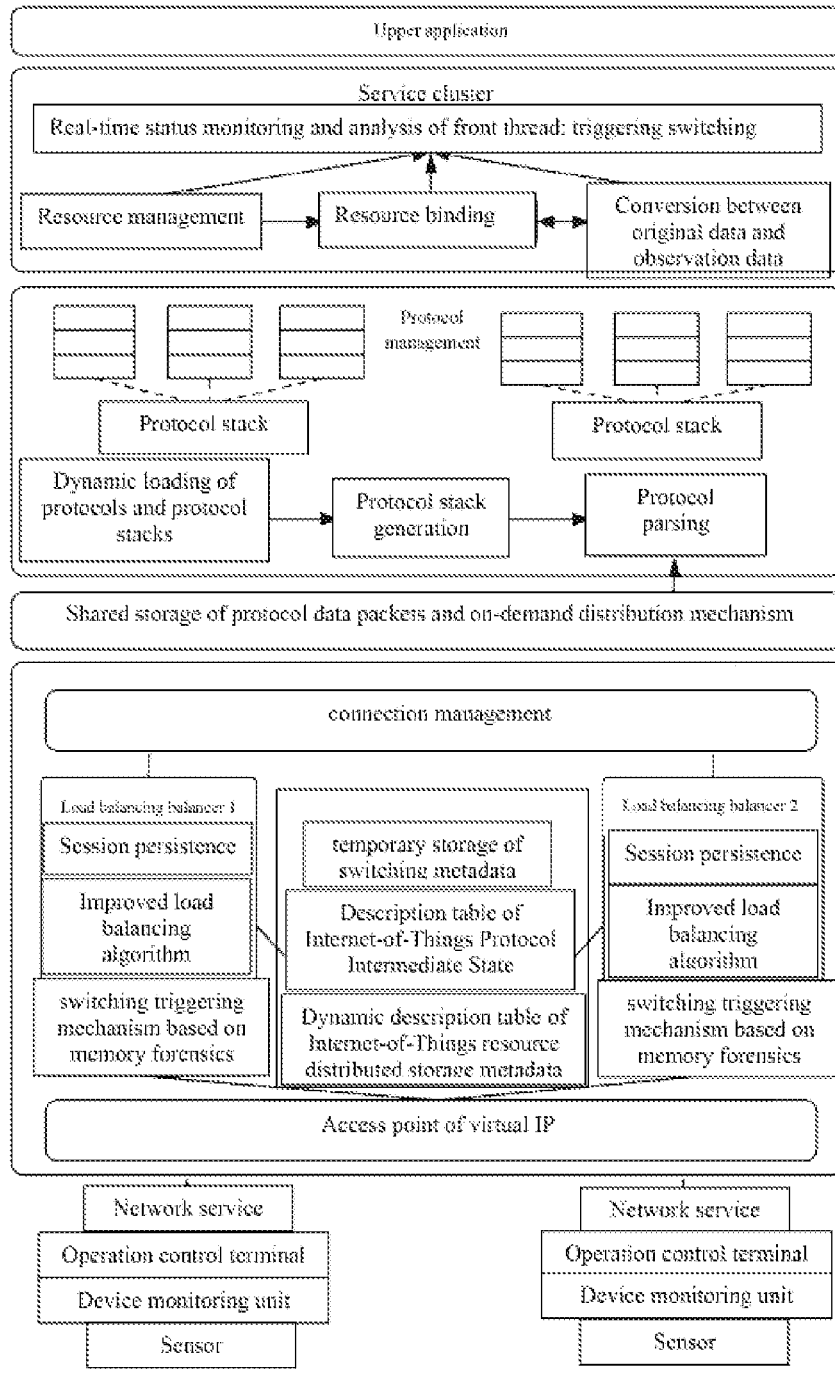
FIG. 1 is an architecture diagram of an Internet-of-Things resource access system provided by embodiments of the present disclosure.

FIG. 1 is an architecture diagram of an Internet-of-Things resource access system provided by embodiments of the present disclosure; and as shown in FIG. 1, the system comprises:

a protocol management subsystem, a data conversion subsystem, and a load balancing subsystem, wherein a protocol management subsystem is configured to obtain protocol frames from shared storage queues of protocol data packets, use a protocol stack to parse the protocol frames into original data payloads and provide the original data payloads to a data conversion subsystem;

the data conversion subsystem is configured to perform protocol management, resource binding and data conversion, load Internet-of-Things resources and convert the original data payloads into observation data through multi-threaded concurrency; and the load balancing subsystem is configured to access the Internet-of-Things resources to the system through virtual IP, connect the Internet-of-Things resource to background service nodes through load balancing servers and send the protocol frames to the shared storage queues of the protocol data packets.

Specifically, the high availability and high concurrency Internet-of-Things resource access system provided by the embodiment comprises the protocol management subsystem, the original data-to-observation data conversion subsystem, and the high availability load balancing subsystem. The protocol management subsystem is the basis of the original data-to-observation data conversion subsystem, and is configured to obtain protocol frames from the shared storage queues of the protocol data packets, use a protocol stack to parse the protocol frames into original data payloads and provide the original data payloads to the original data-to-observation data conversion subsystem, so that the system can flexibly configure the protocols and the protocol stack, and support the secondary development of the protocols. The original data-to-observation data conversion subsystem is configured to perform protocol management, resource binding and data conversion, load the Internet-of-Things resources and convert the binary original data payloads into observation data with practical significance through multi-threaded concurrency; and the high availability load balancing subsystem is configured to improve the concurrency and availability of the system, access the Internet-of-Things resources to the system through virtual IP, connect the Internet-of-Things resource to background service nodes through the load balancing servers and send the protocol frames from the Internet-of-Things resources to the shared storage queues of the protocol data packets. By monitoring the running state of the thread of the system, when thread exception is found, the service node switching is quickly triggered, and the state migration is performed, so that the high availability of the system is ensured.

The Internet-of-Things resource access system provided by the embodiments of the present disclosure not only realizes the simultaneous application of ends, edges, and clouds in the aspects of Internet-of-Things resource access, resource management, protocol analysis, etc., but also supports automatic adaptation, ensures a sufficient degree of flexibility, and supports multiple system deployment modes.

Figure 2A:
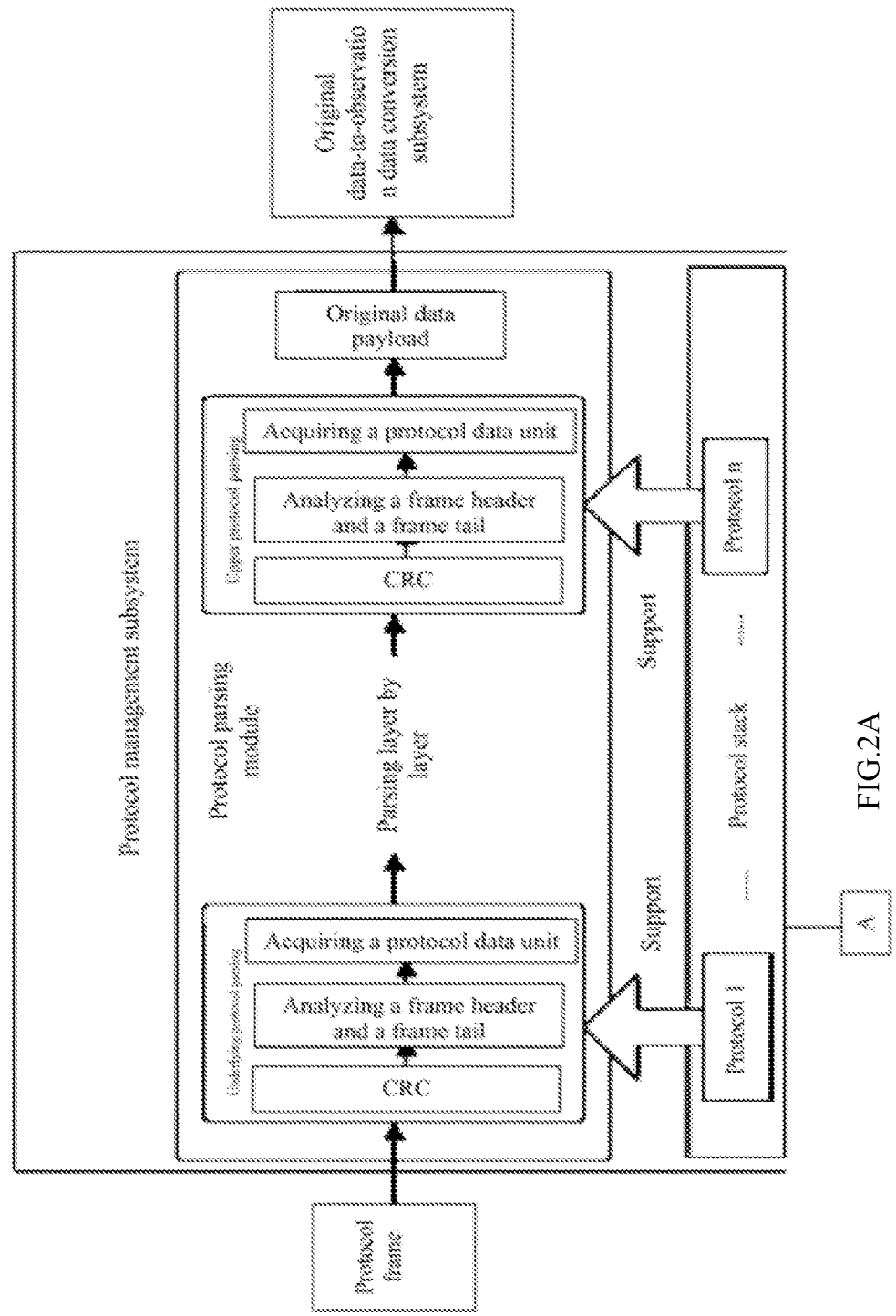
FIG. 2A-2C are schematic diagrams of a protocol management subsystem provided by embodiments of the present disclosure.
Figure 2B:
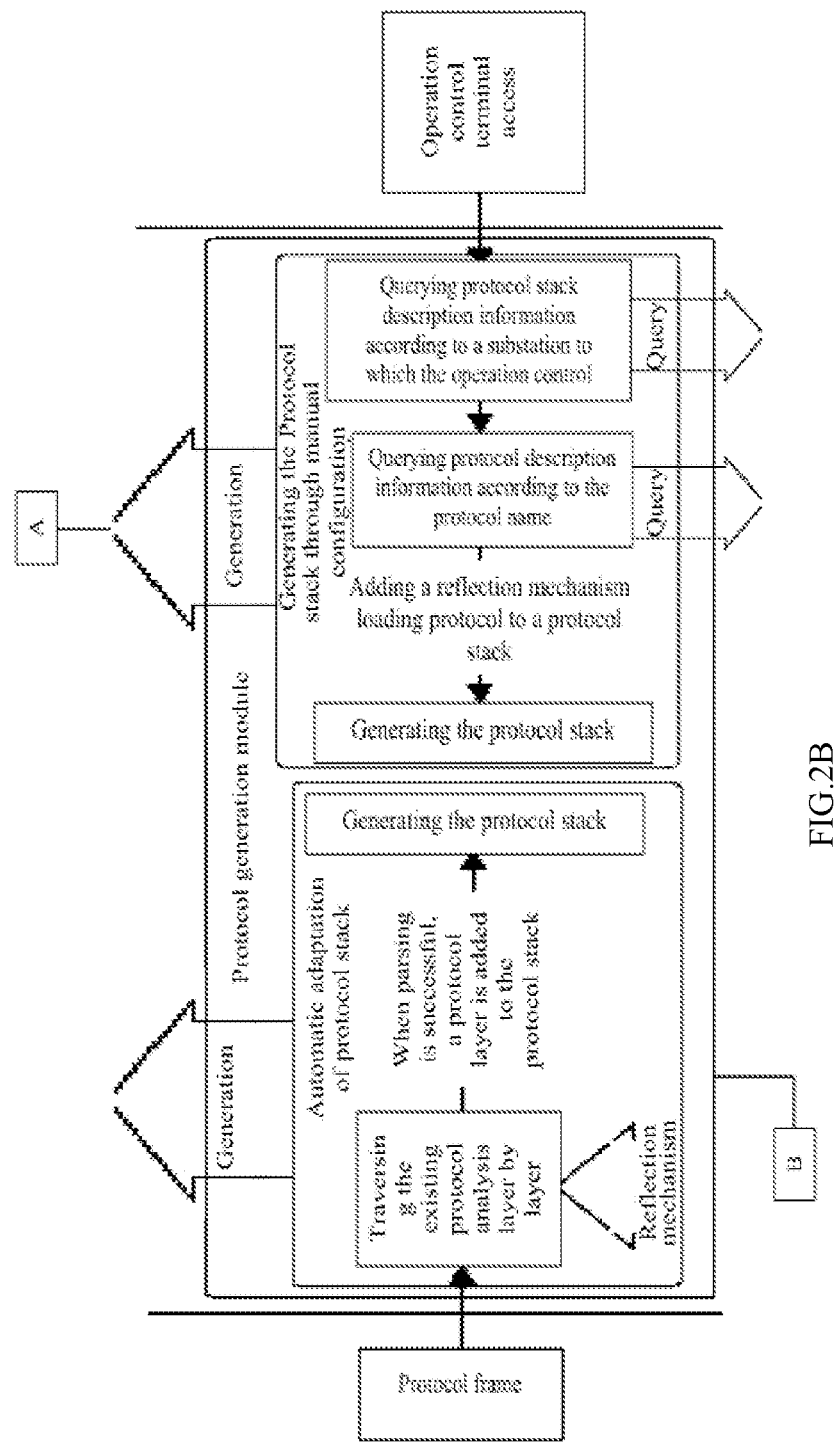
Figure 2C:
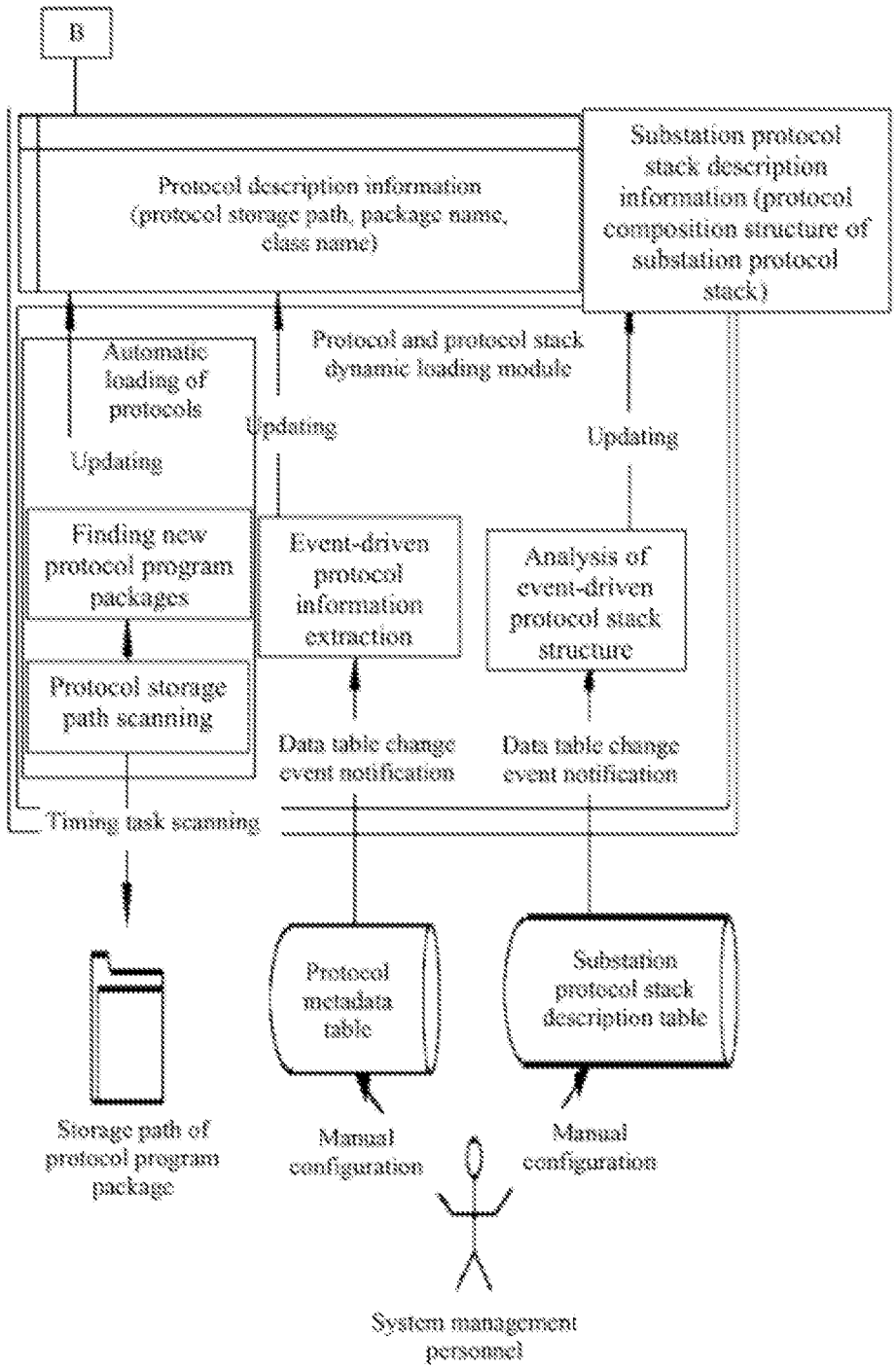

Based on the above embodiment, as shown in FIG. 2A-2C, the protocol management subsystem comprises a protocol and protocol stack dynamic loading module, a protocol stack generation module and a protocol parsing module, wherein the protocol and protocol stack dynamic loading module is configured to dynamically load protocols and the protocol stack in preset configuration modes;

the protocol stack generation module is configured to generate the protocol stack in preset configuration modes; and the protocol parsing module is configured to use the protocol stack to parse the protocol frames layer by layer.

Wherein the preset configuration modes comprise manual configuration and automatic configuration.

Specifically, FIG. 2A-2C are the schematic diagrams of the protocol management subsystem, and the protocol management subsystem comprises the protocol and protocol stack dynamic loading module, the protocol stack generation module and the protocol parsing module, wherein the protocol and protocol stack dynamic loading module supports dynamic loading of the protocols and the protocol stacks through manual configuration and automatic configuration. The user manually configures a protocol metadata table and a protocol stack description information table, and the data table change notification, and the protocol and protocol stack dynamic loading module drive the dynamic loading of the protocol and protocol stack, which is a manual configuration method. The automatic configuration method completes the dynamic loading of the protocols by using the timing task to scan the storage location of the protocol program package and using the reflection mechanism to load the protocol when the new protocol program package is found.

The protocol stack generation module is configured to generate the protocol stack, and supports manual configuration and automatic adaptation of the protocol stack. For manual configuration, the protocol stack generation module obtains the corresponding protocol stack description information according to the name of a station to which the operation control terminal connected to the Internet-of-Things resource belongs, and generates the protocol stack based on the reflection mechanism. The method of automatic adaptation of the protocol stack is usually used in the case of failure of manual configuration. The protocol stack generation module is configured to instantiate the loaded protocols in a memory based on the reflection mechanism, traverse the protocols, and verify whether each protocol can parse the received protocol frame. In the case of successful parsing, the protocol is added to the protocol stack, and the process of traversing the protocols and verifying the parsing is repeated until the protocol frame cannot be parsed by any protocol. The protocol stack is generated and the automatic adaptation of the protocol stack is completed. After the protocol stack is generated, the protocol stack is passed to the protocol parsing module for use.

The protocol parsing module is configured to use the generated protocol stack to parse the protocol frames layer by layer; In the parsing process of each layer of protocols, the protocol parsing module first performs CRC (Cyclic Redundancy Check) on the protocol frame. After the check is passed, the frame header and frame tail are parsed according to the protocol, and then the protocol data unit of the protocols at this layer is obtained. After the top-level protocol parsing, the protocol parsing module obtains the original data payload, completes the protocol parsing, and transmits the original data payload to the original data-to-observation data conversion subsystem.

Based on any of the above embodiments, the data conversion subsystem comprises a resource management module, a resource binding module, and a data conversion module, wherein the resource management module is configured to instantiate the Internet-of-Things resources;

the resource binding module is configured to bind the Internet-of-Things resources with semantic information; and the data conversion module is configured to interpret and use data of the original data payloads.

The data conversion subsystem comprises a resource management module, a resource binding module, and a data conversion module, wherein the resource management module reads the persistent Internet-of-Things resource description information, instantiates the resource, realizes the mapping between the physical level and the application level of the resource, and establishes the mapping relationship between the Internet-of-Things resource entity and an Internet-of-Things resource identifier;

the resource binding module reads the persistent description information of the Internet-of-Things resources, and binds the Internet-of-Things resources with semantic information for the query of the original data-to-observation data conversion module so as to realize the addition of semantic information to the observation data value of the Internet-of-Things resources.

The data conversion module is configured to interpret and use original data of the Internet-of-Things resources. Firstly, the Internet-of-Things resource identifier is obtained, and is converted into the corresponding Internet-of-Things resource entity according to the mapping relationship. Then, an information description table of the Internet-of-Things resources is queried to obtain data conversion types and conversion methods of the Internet-of-Things resources. According to different data conversion types, different calculation methods are used to obtain the observation data values, and the data interpretation is completed. After the observation data values of the Internet-of-Things resource are obtained, the original data-to-observation data conversion module queries the semantic information bound to the Internet-of-Things resource, adds the semantic information to the observation data values of the Internet-of-Things resource, generates data messages, and meanwhile, query a remote communication table and a remote measuring table according to the type of observation data of the Internet-of-Things resources, determine whether the observation data is out of limit, and generates event messages according to the judgment results. The original data-to-observation data conversion module sends data messages and event messages to the unified message space according to the theme to complete the data usage process. Other Internet-of-Things application systems obtain messages from the unified message space according to the theme.

Figure 3:
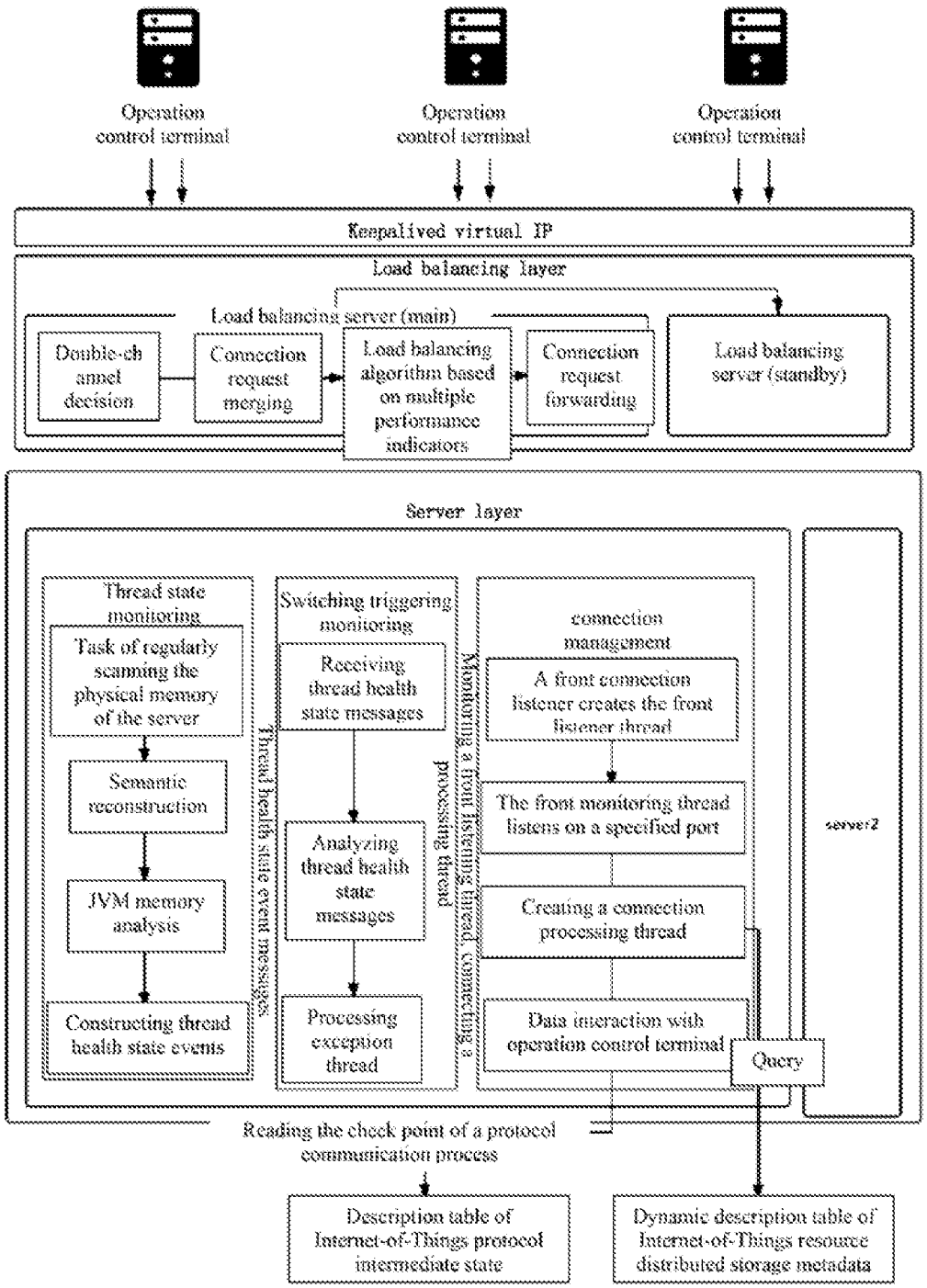
FIG. 3 is a schematic diagram of a load balancing subsystem provided by embodiments of the present disclosure.

Based on any of the above embodiments, as shown in FIG. 3, the load balancing subsystem comprises a connection management module, a thread monitoring and switching triggering function module, a load balancing function module and a service node state migration mechanism module, wherein the connection management module is configured to establish and manage a data path between service nodes and the Internet-of-Things resources;

the thread monitoring and switching triggering function module is configured to monitor the running state of the front thread of the system based on a memory forensics technology, construct a thread health state event when the state of the front thread is abnormal, and trigger the switching of the service nodes;

the load balancing function module is configured to forward the connection request of the Internet-of-Things resources to an available service node based on an improved load balancing algorithm; and the service node state migration mechanism module is configured to read a checkpoint of a communication process when the data path is abnormal, and complete the state migration of the service node.

The improved load balancing algorithm is obtained by two-channel decision provided by the load balancing server, connection request merging and based on the performance of several servers.

Specifically, FIG. 3 is a schematic diagram of the load balancing subsystem. The load balancing subsystem comprises the connection management module, the thread monitoring and switching triggering function module, the load balancing function module and the service node state migration mechanism module, wherein the connection management module is configured to establish and manage the data path between the service nodes and the operation control terminal connected to the Internet-of-Things resources;

In the thread monitoring and switching triggering function module, a thread monitoring function is based on a memory forensics technology, monitors the running state of the system thread by regularly scanning the physical memory of the service node and performing semantic reconstruction and memory analysis, constructs a thread health state event when the thread state is abnormal, and sends a thread health state event message; and a switching triggering function processes the abnormal thread by parsing the thread health state event message, and triggers the service node switching.

The load balancing service module starts when the operation control terminal sends a connection request to the virtual IP through two channels, and the connection request will be forwarded to an available service node through two-channel decision provided by the load balancing server, connection request merging and the improved load balancing algorithm based on the performance of multiple servers.

The service node state migration mechanism module works when the connection between the operation control terminal and the service node is abnormal. After the operation control terminal is reconnected to another service node, the service node state migration mechanism module loads the Internet-of-Things resource data by querying an Internet-of-Things resource distributed storage metadata table, reads the check point of the protocol communication process in the Internet-of-Things protocol intermediate state description table, and realizes the migration of the service node state based on a set of service node state migration method suitable for the system.

Figure 4:
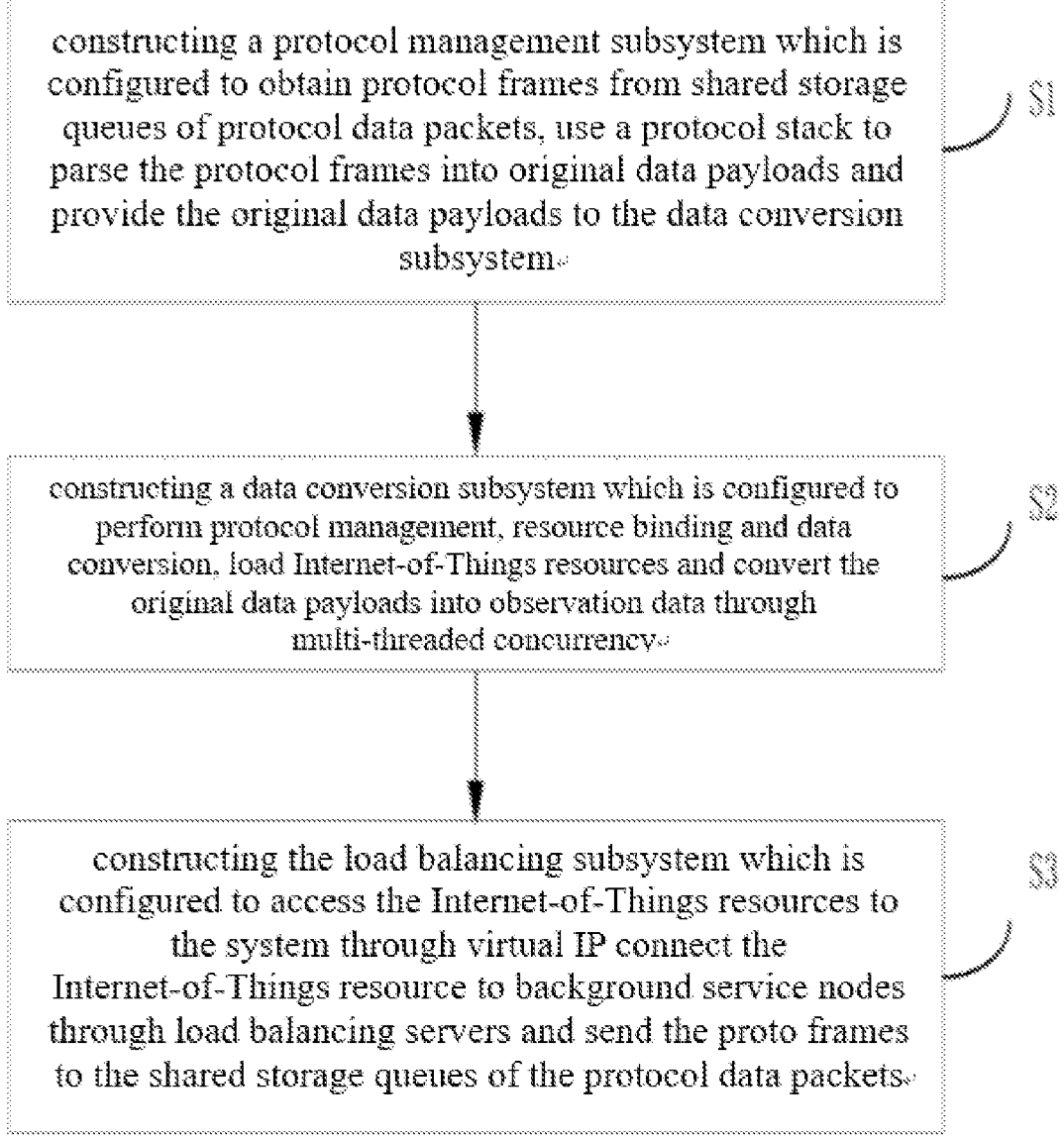
FIG. 4 is a flowchart of an Internet-of-Things resource access method provided by embodiments of the present disclosure.

FIG. 4 is a flowchart of an Internet-of-Things resource access method provided by embodiments of the present disclosure, and as shown in FIG. 4, the flowchart comprises:

step S1. constructing a protocol management subsystem which is configured to obtain protocol frames from shared storage queues of protocol data packets, use a protocol stack to parse the protocol frames into original data payloads and provide the original data payloads to the data conversion subsystem;

step S2. constructing a data conversion subsystem which is configured to perform protocol management, resource binding and data conversion, load Internet-of-Things resources and convert the original data payloads into observation data through multi-threaded concurrency; and step S3. constructing the load balancing subsystem which is configured to access the Internet-of-Things resources to the system through virtual IP, connect the Internet-of-Things resource to background service nodes through load balancing servers and send the protocol frames to the shared storage queues of the protocol data packets.

The Internet-of-Things resource access system provided by the embodiments of the present disclosure not only realizes the simultaneous application of end, edge, and cloud in the aspects of Internet-of-Things resource access, resource management, protocol analysis, etc., but also supports automatic adaptation, ensures a sufficient degree of flexibility, and supports multiple system deployment modes.

Figure 5:
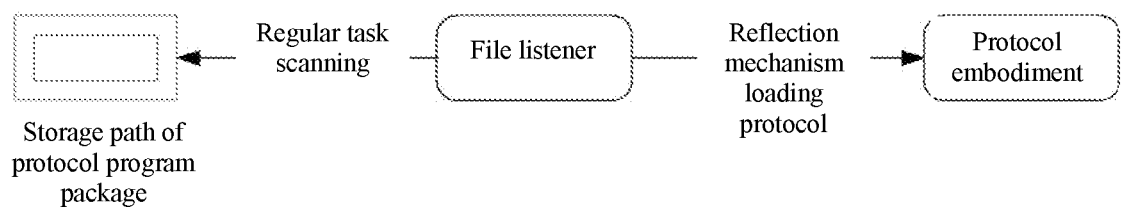
FIG. 5 is a flowchart of a protocol dynamic loading function provided by embodiments of the present disclosure.

Based on the above embodiments, as shown in FIG. 5, the constructing the data conversion subsystem further comprises establishing a data interpretation process flow, and the establishing a data interpretation process flow specifically comprises steps:

performing protocol analysis on the original data payloads in the Internet-of-Things resources;

acquiring the address of a monitoring unit connected to the Internet-of-Things resource of an original data payload header;

If it is determined that the original data payload has remaining content, obtaining the first address of the Internet-of-Things resource;

according to the address of the monitoring unit, the address of a sensor and the name of a substation, determining a single Internet-of-Things resource entity, and querying the data type and data conversion information of the Internet-of-Things resource entity;

according to the original data length, intercepting the original data of the Internet-of-Things resource monitoring from the original data payload;

converting the original data into observation data by using the data conversion information according to the data type; and completing the data interpretation corresponding to the first address, returning to determine that the original data payload has residual content, and obtaining the remaining addresses of the Internet-of-Things resources until all data interpretation of the original data payload is completed.

Specifically, FIG. 5 is the flow chart of a protocol dynamic loading function, which comprises a file listener executes the task of regularly scanning the storage path of a specified protocol program package; and when the file listener finds that there is a new protocol package in the storage location of the protocol program package, the protocols are loaded based on a reflection mechanism.

Figure 6:
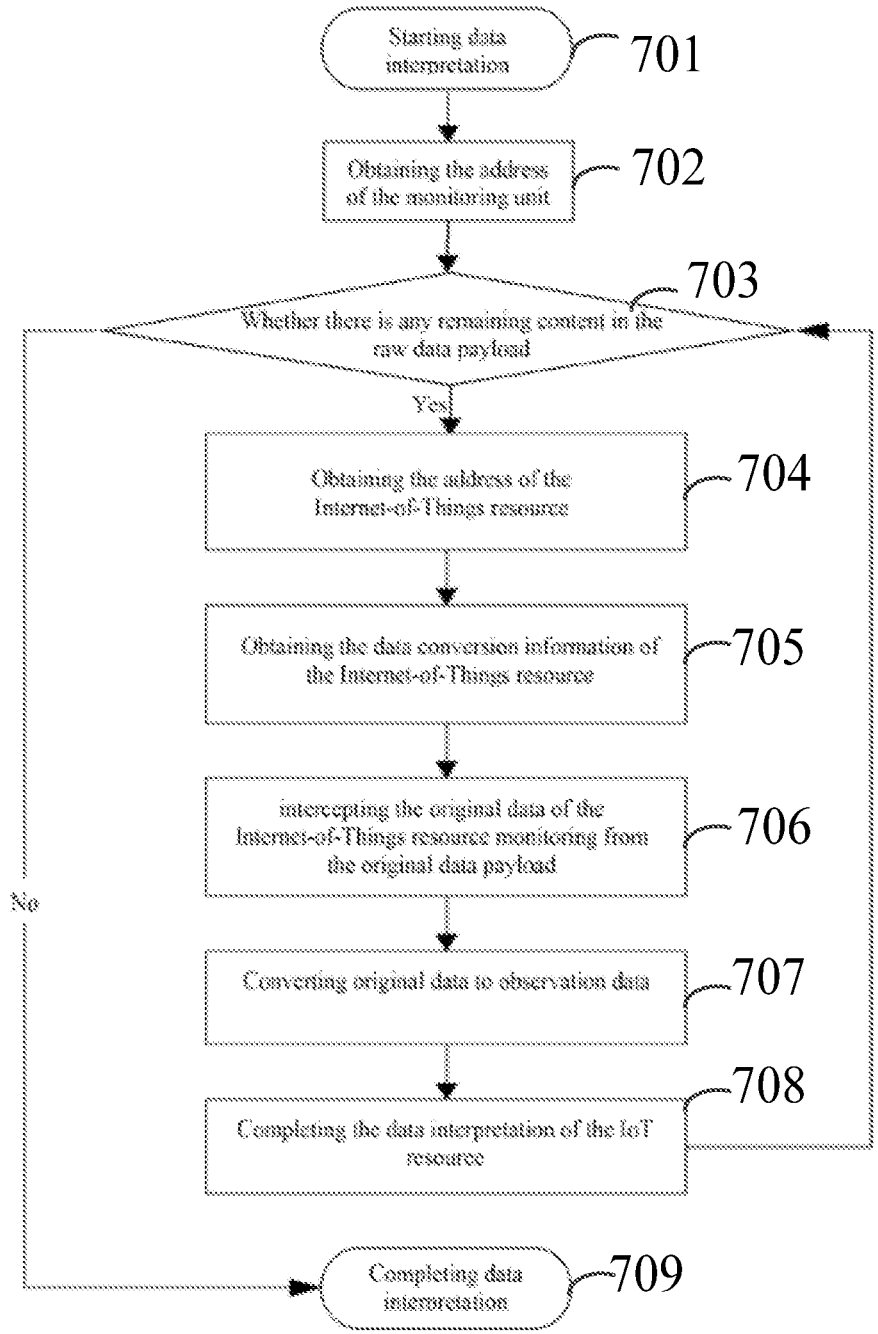
FIG. 6 is a schematic diagram of a data interpretation process flow provided by embodiments of the present disclosure.

Based on any of the above embodiments, as shown in FIG. 6, the constructing the data conversion subsystem further comprises establishing a data interpretation process flow, and the establishing a data interpretation process flow specifically comprises steps:

performing protocol analysis on the original data payloads in the Internet-of-Things resources;

acquiring the address of a monitoring unit connected to the Internet-of-Things resource of an original data payload header;

If it is determined that the original data payload has remaining content, obtaining the first address of the Internet-of-Things resource;

according to the address of the monitoring unit, the address of a sensor and the name of a substation, determining a single Internet-of-Things resource entity, and querying the data type and data conversion information of the Internet-of-Things resource entity;

according to the original data length, intercepting the original data of the Internet-of-Things resource monitoring from the original data payload;

converting the original data into observation data by using the data conversion information according to the data type; and completing the data interpretation corresponding to the first address, returning to determine that the original data payload has remaining content, and obtaining the remaining addresses of the Internet-of-Things resources until all data interpretation of the original data payload is completed.

Specifically, FIG. 6 is a schematic diagram of a data interpretation process flow, which comprises steps:

step 701. performing protocol analysis on the original data payloads in the Internet-of-Things resources;

step 702. acquiring the address of a monitoring unit connected to the Internet-of-Things resource of an original data payload header;

step 703. determining whether there is any remaining content in the original data payload;

step 704. acquiring the address of the first Internet-of-Things resource;

step 705. according to the address of the monitoring unit, the address of the sensor and the name of the substation, determining the single Internet-of-Things resource entity, and after determining the Internet-of-Things resource entity, querying the data type and data conversion information of the Internet-of-Things resource;

step 706. according to the original data length, intercepting the original data of the Internet-of-Things resource monitoring from the original data payload;

step 707. converting the original data into observation data by using the data conversion information according to the data type;

step 708. completing the data interpretation of the Internet-of-Things resource, and returning to the step 703; and step 709. completing the data interpretation of all the original data of the Internet-of-Things resources in the original data payload.

Figure 7:
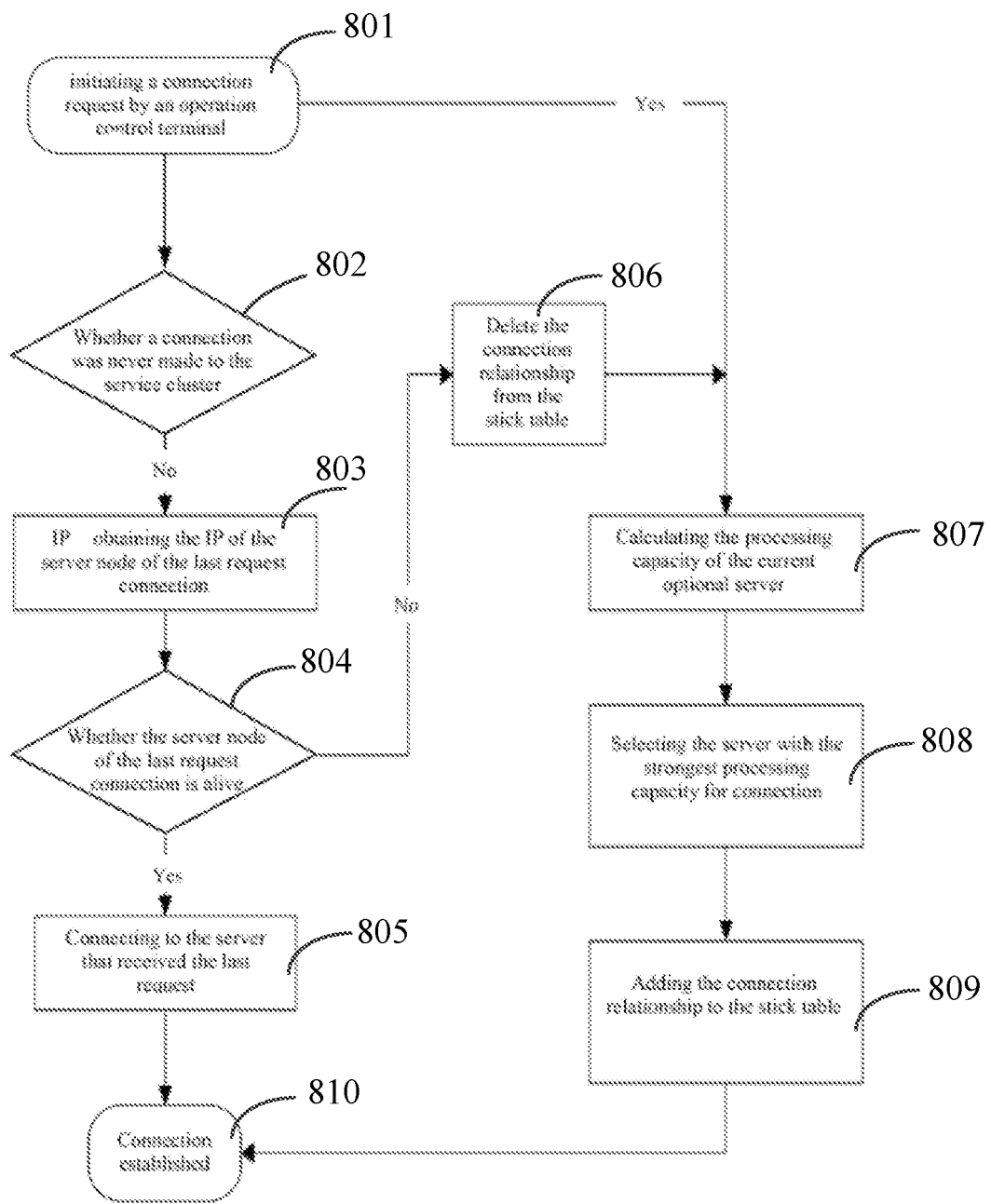
FIG. 7 is a flowchart of an improved load balancing algorithm provided by embodiments of the present disclosure.

Based on any one of the above embodiments, as shown in FIG. 7, the constructing the load balancing subsystem further comprises establishing an improved load balancing algorithm flow based on the performance of several servers, and the establishing an improved load balancing algorithm flow based on the performance of several servers specifically comprises steps:

adding a session stick table to the load balancing server;

initiating a connection request by an operation control terminal to the service cluster;

the load balancing server obtains the connection request, and query whether the session stick table session contains the connection record of the operation control terminal;

if it is determined that the session stick table contains the connection record, obtaining the IP of the service node connected by the operation control terminal last time;

the load balancing server detects the service node connected by the operation control terminal last time, and determines whether the service node is alive or not;

forwarding the connection request to the service node connected by the operation control terminal last time;

removing the connection relationship between the operation control terminal and the service node from the session stick table;

calculating the request processing capability of all optional service nodes in the service cluster, and the load balancer forwards the connection request to the server node with the strongest current request processing capability;

storing the connection relationship between the operation control terminal and the server node with the strongest current request processing capability into the session stick table; and the operation control terminal is successfully connected to the service node.

Specifically, FIG. 7 is a flow chart of an improved load balancing algorithm based on the performance of several servers, wherein the session stick table is added in the load balancing server to implement session stick. The stick table stores the corresponding relationship between the operation control terminal and the service node in the form of a key-value pair, the key of the key-value pair is the IP of the operation control terminal, and the value is the IP of the background service node.

Step 801. the operation control terminal initiates the connection request to the service cluster.

Step 802. the load balancing server obtains the connection request from the operation control terminal, and query whether the session stick table session contains the connection record of the operation control terminal.

Step 803. if there is the connection record of the operation control terminal in the stick table, the IP of the service node connected by the operation control terminal last time is obtained.

Step 804. the load balancing server detects the service node connected by the operation control terminal last time, and determines whether the service node is alive or not.

Step 805. the connection request of the operation control terminal is forwarded to the service node recorded in the stick table and connected by the operation control terminal last time.

Step 806. the connection relationship between the operation control terminal and the service node is removed from the stick table.

Step 807. the request processing capacity of all current optional service nodes in the service cluster is calculated.

Step 808. the load balancer forwards the connection request of the operation control terminal to the server node with the strongest current request processing capability.

Step 809. the connection relationship between the operation control terminal and the service node is stored in the stick table.

Step 810. the operation control terminal is successfully connected to the service node.

Wherein the quantification method of the request processing capability of the server node is as follows.

Assuming that in unit time T, the average CPU utilization rate of the itch server node is $CP(i)$, the average memory utilization rate is $MP(i)$, and the average bandwidth utilization rate is $BP(i)$. Assuming that the average number of connections of the i-th server node is $L(i)$, the ratio of the number of connections of the server node to the total number of connections in the service cluster is:

$$LP(i)=L(i)/\Sigma iL(i)$$

Different factors have different influences on the performance of the server, and let $kC$, $kM$, $kB$, $kL$ be the influencing factors of CPU, memory, bandwidth occupancy rate, and the number of connections respectively on the server performance, which meet the following requirements:

$$kC+kM+kB+kL=1$$

The values of $kC$, $kM$, $kB$ and $kL$ are not less than 0, and are set according to the actual situation.

Let the load balancing capability of the server node be $LB(i)$, then the calculation formula of $LB(i)$ is:

$$LB(i)=kC\times CP(i)+kM\times MP(i)+kB\times BP(i)+kL\times LP(i)$$

The lower the utilization rate of the CPU and memory, the more idle the CPU and memory of the machine, and thus, more tasks can be performed. The network bandwidth utilization rate is low, which means that the machine can send and receive more data concurrently. The total connection ratio is low, which means that the machine has less tasks in the whole service cluster, and more connections can be initiated to the machine. Therefore, the CPU utilization rate, the memory utilization rate, the network bandwidth utilization rate and the total connection ratio are negatively correlated with the request processing capacity of the server node, that is, the smaller the values of the four indicators, the stronger the request processing capacity of the machine. Therefore, the smaller the LB (i) value of the service node, the stronger the request processing ability of the service node. After the LB (i) values of all the optional service nodes are calculated, the load balancing server forwards the connection request of the operation control terminal to the service node with the smallest LB (i) value.

The device embodiments described above are merely illustrative. The units described above as separated components may or may not be physically separated, and components shown as units may or may not be physical units, i.e., may be located at one place, or may be distributed across multiple network units. Some or all of the modules may be selected according to actual needs to achieve the purpose of the solution of the present embodiment. Those of ordinary skill in the art would understand and practice without involving any inventive effort.

Through the description of the above implementations, those skilled in the art can clearly understand that each embodiment may be implemented by means of software plus a necessary general hardware platform, of course, hardware can also be used. Based on such understanding, the essence of the above technical solution or parts making contributions to the prior art may be embodied in the form of a software product, and the computer software product may be stored in computer-readable storage media such as ROM/RAM, magnetic disks, optical disks, etc., including instructions for enabling a computer device (which may be a personal computer, a server, or a network device, etc.) to perform the methods described in the various embodiments or some parts of the embodiment.

It should be illustrated finally that the above embodiments are only used for illustrating the technical solutions of the present disclosure, and are not intended to limit the present disclosure; although the present disclosure is illustrated in detail with reference to the foregoing embodiments, it should be understood by those skilled in the art that, modifications may still be made on the technical solutions written by the foregoing embodiments, or equivalent replacements are made on part of technical features; and these modifications or replacements do not make the essence of the corresponding technical solutions depart from the spirit and scope of the technical solution of the various embodiments of the present disclosure.

What is claimed is:

1. An Internet-of-Things resource access method, comprising:
   constructing a protocol management subsystem, a data conversion subsystem and a load balancing subsystem;
   obtaining, by the protocol management subsystem, protocol frames from shared storage queues of protocol data packets, using a protocol stack to parse the protocol frames into original data payloads and providing the original data payloads to the data conversion subsystem;
   loading, by the data conversion subsystem, Internet-of-Things resources and converting the original data payloads into observation data through multi-threaded concurrency;
   accessing, by the load balancing subsystem, the Internet-of-Things resources through a virtual Internet Protocol (IP), connecting the Internet-of-Things resources to background service nodes through load balancing servers and sending the protocol frames to the shared storage queues of the protocol data packets.

2. The Internet-of-Things resource access method of claim 1, further comprising:
   establishing a protocol dynamic loading function process, wherein the establishing the protocol dynamic loading function process comprises
   executing, by a file listener, a task of regularly scanning a storage path of a specified protocol program package; and
   if the file listener determines that there is a new protocol package in a storage location of the specified protocol program package, loading protocols based on a reflection mechanism.

3. The Internet-of-Things resource access method of claim 1, further comprising: establishing a data interpretation process flow, wherein the establishing the data interpretation process flow comprises:
   performing protocol analysis on the original data payloads in the Internet-of-Things resources;
   acquiring an address of a monitoring unit connected to the Internet-of-Things resources of an original data payload header;
   If it is determined that the original data payloads have remaining content, obtaining a first address of the Internet-of-Things resources;
   according to the address of the monitoring unit, an address of a sensor and a name of a substation, determining a single Internet-of-Things resource entity, and querying a data type and data conversion information of the single Internet-of-Things resource entity;
   according to an original data length, intercepting an original data of the Internet-of-Things resources monitoring from the original data payloads;
   converting the original data into the observation data by using the data conversion information according to the data type; and
   completing data interpretation corresponding to the first address, returning to determine that the original data payloads have remaining content, and obtaining remaining addresses of the Internet-of-Things resources until all the data interpretation of the original data payloads is completed.

4. The Internet-of-Things resource access method of claim 1, further comprising: establishing an improved load balancing algorithm flow based on performance of several servers, wherein the establishing the improved load balancing algorithm flow based on the performance of several servers comprises:
   adding a session stick table to the load balancing servers;
   initiating a connection request by an operation control terminal to a service cluster;
   obtaining, by the load balancing servers, the connection request, and querying whether the session stick table contains a connection record of the operation control terminal;
   if it is determined that the session stick table contains the connection record, obtaining the IP of a service node connected by the operation control terminal last time;
   the load balancing servers detecting the service node connected by the operation control terminal last time, and determining whether the service node is alive or not;
   forwarding the connection request to the service node connected by the operation control terminal last time;
   removing a connection relationship between the operation control terminal and the service node from the session stick table;
   calculating a request processing capability of all optional service nodes in the service cluster, and the load balancing servers forwarding the connection request to the service node with a strongest current request processing capability, wherein the strongest current request processing capability of the service node represents a smallest load balancing capability of the service node within the all optional service nodes;
   storing the connection relationship between the operation control terminal and the service node with the strongest current request processing capability into the session stick table; and
   the operation control terminal is successfully connected to the service node.

5. The Internet-of-Things resource access method of claim 4, wherein the improved load balancing algorithm is obtained by two-channel decision provided by the load balancing servers, connection request merging and based on the performance of several servers.

6. The Internet-of-Things resource access method of claim 1, further comprising:
   dynamically loading protocols and the protocol stack in preset configuration modes;
   generating the protocol stack in the preset configuration modes;
   using the protocol stack to parse the protocol frames layer by layer.

* * * * *